F. F. WEAR.
SELF INFLATING AND NON-COLLAPSIBLE PNEUMATIC TIRE.
APPLICATION FILED NOV. 23, 1910.

1,035,283.

Patented Aug. 13, 1912.

WITNESSES:

INVENTOR
F. F. Wear
BY
F. M. Wright
ATTORNEY

UNITED STATES PATENT OFFICE.

FRANK F. WEAR, OF SAN FRANCISCO, CALIFORNIA, ASSIGNOR TO HIMSELF, AS TRUSTEE.

SELF-INFLATING AND NON-COLLAPSIBLE PNEUMATIC TIRE.

1,035,283. Specification of Letters Patent. Patented Aug. 13, 1912.

Application filed November 23, 1910. Serial No. 593,917.

*To all whom it may concern:*

Be it known that I, FRANK F. WEAR, a citizen of the United States, residing at San Francisco, in the county of San Francisco and State of California, have invented new and useful Improvements in Self-Inflating and Non-Collapsible Pneumatic Tires, of which the following is a specification.

The present invention relates to improvements in means for inflating pneumatic tires for vehicles and the object of the invention is to provide such means that the pneumatic tire equipped therewith will be practically non-collapsible, will not "blow-out" by overheating, and will be, by the running of the vehicle, automatically maintained at the desired degree of pressure.

Figure 1:
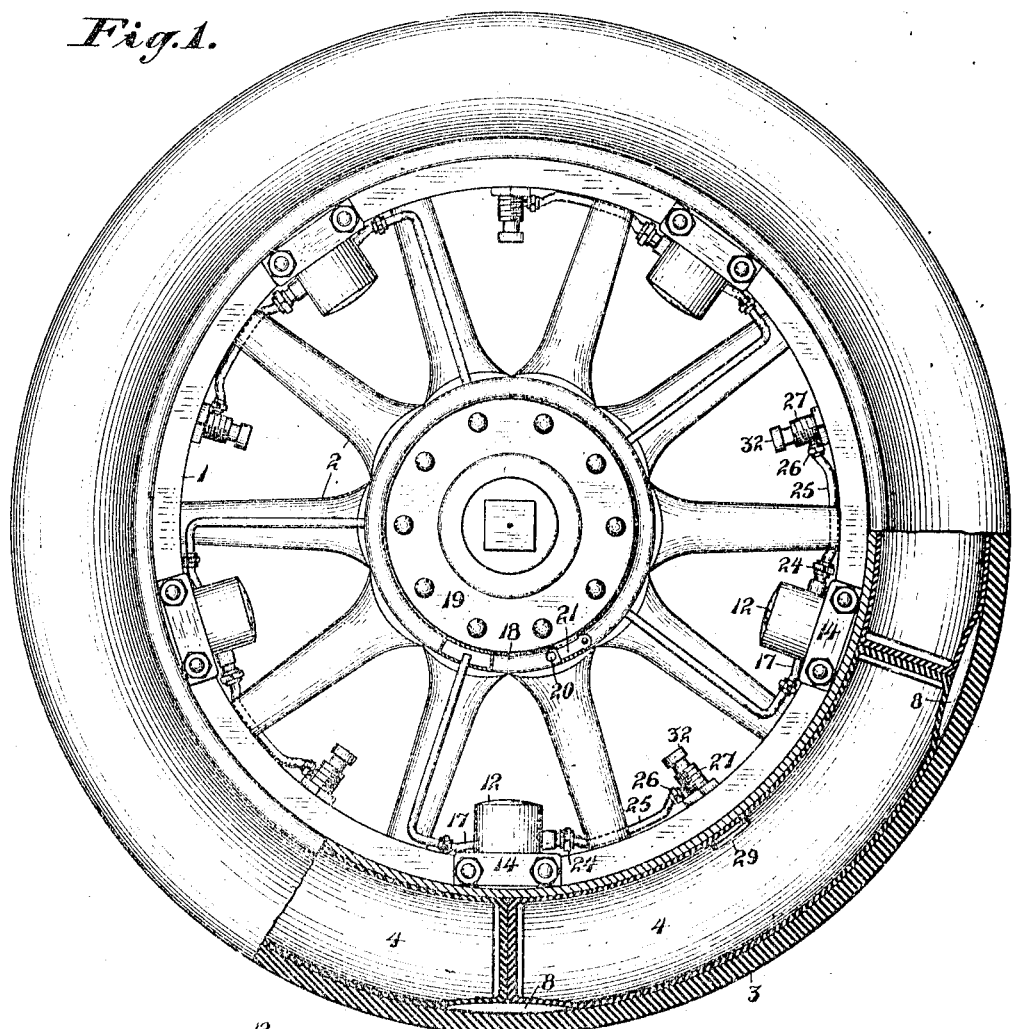
Figure 2:
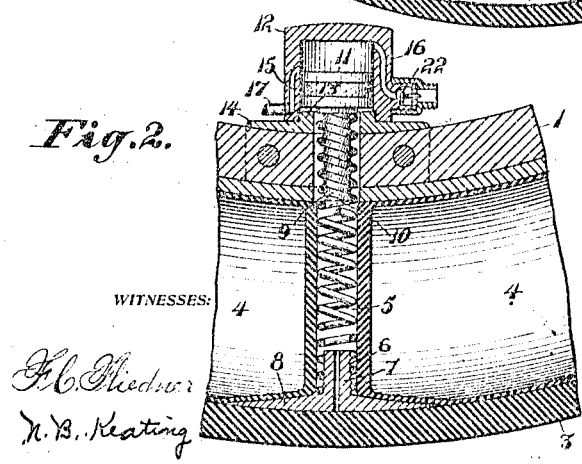
Figure 3:
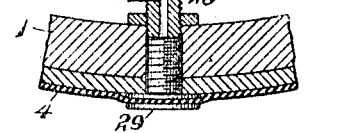

In the accompanying drawing, Figure 1 is a broken side view of a wheel equipped with my improvement; Fig. 2 is an enlarged detail vertical section of the pump; Fig. 3 is a similar view of the inlet casing.

Referring to the drawing, 1 indicates a rim of a wheel having spokes 2 and an outer casing 3. The inner pneumatic tube is divided circumferentially into sections 4, having ends abutting against each other, said abutting ends being suitably strengthened by canvas or otherwise, and between each pair of abutting ends is interposed a helical spring 5. The outer terminal portion of said spring is inserted in a helical groove 6 of a stem 7 extending inwardly from a plate 8 secured between the outer casing and the inner casing sections. The inner end of said helical spring is received in a helical groove 9 of a stem 10 of a pump plunger 11, which reciprocates in a cylinder 12 closed at the inner end, said cylinder being screwed on to a collar 13 extending from a yoke 14 which is secured to the rim of the wheel. The casing of each cylinder 12 has formed therein an inlet conduit 15, and an outlet conduit 16. The inlet conduits are each connected to tubes 17, which extend along the rim of the wheel, and then inwardly along the several spokes thereof, and are connected at the inner ends of the spokes to an annular tube 18 secured on the hub 19 of the wheel, said tube 18 having a hole 20. The object of this arrangement is to prevent water entering said pump cylinders in the ordinary running of the machine. When washing the wheel, the hole 20 is covered by a slide plate 21 to exclude water.

The outlet conduit 16 of the pump cylinder connects by a union 24 with a pipe 25 which connects by a union 26 with an inlet casing 27, having a conduit 28, which connects as shown at 29 with the inner tube section of the tire. At the outer end of said outlet conduit is a valve 22 pressed to its seat by the air pressure, which is the same as that in the tire. In the inlet casing 27 is a safety valve 30, pressed to its valve seat by a spring 31, said spring being adapted to be adjusted by a screw cap 32 said valve when open permitting air to escape through holes 33. The spring is adjusted so that the valve opens when the pressure within the tire exceeds that which it is desired to use. By this arrangement, "blow-outs", a frequent cause of serious injuries, are eliminated.

The following is the mode of operation of the apparatus. In the ordinary running of the automobile, the pneumatic tire is alternately compressed and expanded as each part thereof arrives in succession at the bottom of the wheel and passes the same, and the pump plunger is reciprocated. As the plunger moves outwardly from its innermost position, the residual air which was left in said cylinder and in the passage to the check valve 22 when the pump plunger was in its innermost position is expanded, and suction is produced in said cylinder, so that, when the pump plunger moves outwardly past the inner end of the inlet conduit 15, air flows through said conduit into said cylinder, and restores the same to atmospheric pressure. Upon the return inward stroke of the plunger, said air is compressed until it reaches the desired pressure, say 80 pounds, whereupon it forces from its seat the valve 22, and flows by the pipe 25, into the conduit 27 of the inlet casing. If the pressure in the tire is below 80 pounds, the compressed air flowing thereinto very quickly raises it to a pressure of 80 pounds. If it is already at 80 pounds pressure, then the compressed air, forced along the pipe 25, makes its escape past the relief valve 30, and through the holes 33. Thus the tire is always maintained at the desired pressure, as, for instance, 80 pounds. The pressure can never exceed the desired degree, for, if increased by the heating of the tires due to rapid travel, the increased pressure causes the air to escape past the relief valve 30, and thus automatically reduces the pressure to the desired degree. In case of a puncture of the outer casing and one of the sections of the inner tube, the pump, corresponding to said section which has been punctured, operates automatically to pump air into said section, and prevent its entire collapse.

I claim:—

A wheel having a rim, an outer casing, pneumatic tube sections having abutting ends, plates, each secured between said outer casing and a pair of tube sections, pump cylinders each arranged adjacent to two of said abutting ends, a plunger in each pump cylinder, a helical spring for each plunger connected at one end to the adjoining plate and at the other end to said plunger, said plunger being otherwise disconnected from said plate, each spring being closely surrounded by the adjacent abutting ends, and means whereby by the motion of each plunger in its cylinder transmitted from the motion of said plate through the medium of said coiled spring, air is compressed and forced into one of said tube sections.

In testimony whereof I have hereunto set my hand in the presence of two subscribing witnesses.

FRANK F. WEAR.

Witnesses:
  N. B. KEATING,
  D. B. RICHARDS.